(12) United States Patent
Besen et al.

(10) Patent No.: US 7,852,406 B2
(45) Date of Patent: Dec. 14, 2010

(54) PROCESSING HIGH DEFINITION VIDEO DATA

(75) Inventors: Peter Besen, North Andover, MA (US); Stephen Gordon, North Andover, MA (US)

(73) Assignee: Broadcom Corporation, Irvine, CA (US)

( * ) Notice: Subject to any disclaimer, the term of this patent is extended or adjusted under 35 U.S.C. 154(b) by 2082 days.

(21) Appl. No.: 10/726,814

(22) Filed: Dec. 3, 2003

(65) Prior Publication Data

US 2004/0114050 A1 Jun. 17, 2004

Related U.S. Application Data

(60) Provisional application No. 60/431,405, filed on Dec. 6, 2002.

(51) Int. Cl.
*H04N 7/01* (2006.01)
*H04N 11/20* (2006.01)
*H04N 5/46* (2006.01)
*H04N 7/00* (2006.01)
*H04N 7/12* (2006.01)
*H04N 11/02* (2006.01)
*H04N 11/04* (2006.01)
*H04N 5/91* (2006.01)

(52) U.S. Cl. .............. 348/458; 348/558; 348/423.1; 375/240.01; 386/123; 386/125

(58) Field of Classification Search .............. 348/458
See application file for complete search history.

(56) References Cited

U.S. PATENT DOCUMENTS

| | | | | |
|---|---|---|---|---|
| 5,515,377 A | * | 5/1996 | Horne et al. | 370/395.64 |
| 5,933,499 A | * | 8/1999 | Enari | 380/217 |
| 6,765,966 B2 | * | 7/2004 | Vince | 375/240.26 |
| 6,810,081 B2 | * | 10/2004 | Dantwala | 375/240.16 |
| 2001/0038746 A1 | * | 11/2001 | Hughes et al. | 386/123 |
| 2001/0055339 A1 | * | 12/2001 | Choi | 375/240.21 |
| 2004/0022318 A1 | * | 2/2004 | Garrido et al. | 375/240.11 |
| 2004/0057624 A1 | * | 3/2004 | Wells | 382/233 |
| 2005/0114909 A1 | * | 5/2005 | Mercier | 725/141 |

OTHER PUBLICATIONS

C.T. Chen, A Single Chip MPEG-2 MP@ML Audio/Video Encoder/Decoder With a Programmable Video Interface Unit, Apr. 1, 2001 IEEE, p. 941-944.*

* cited by examiner

*Primary Examiner*—Marsha D. Banks-Harold
*Assistant Examiner*—Jessica Roberts
(74) *Attorney, Agent, or Firm*—McAndrews, Held & Malloy, Ltd.

(57) ABSTRACT

Video data is processed. A first high definition program stream is received that includes a first high definition video stream component. A first standard definition program stream is derived from the high definition program stream. A second standard definition is received having been derived from the first standard definition program stream. A second high definition program stream is derived from the second standard definition program stream and the first high definition video stream component.

15 Claims, 5 Drawing Sheets

PROCESSING HIGH DEFINITION VIDEO DATA

CROSS REFERENCE TO RELATED APPLICATIONS

The present application claims the benefit of and priority to U.S. provisional application Ser. No. 60/431,405, filed Dec. 6, 2002, entitled "Method And System For Allowing A Standard Digital Video Disc Player To Play High Definition Digital Video Discs," the entire disclosure of which is herein incorporated by reference.

TECHNICAL FIELD

The invention relates to processing high definition digital video information. In particular, one aspect of the invention relates to a High-Definition Digital Video Disc ("HD-DVD") Coprocessor for use with a standard definition DVD player architecture to play HD-DVD discs and produce a High Definition video output.

BACKGROUND INFORMATION

Digital video discs ("DVDs") provide significant improvements over prior technologies such as video cassette tapes. Some of these improvements include enhanced images, digital audio, and the addition of menus for facilitating rapid navigation from scene to scene.

To enhance the quality of films viewed on DVD, the industry has developed a high-definition video compression format, H.264/MPEG-4. The H.264/MPEG-4 format has an increased resolution of up to 1920×1080 pixels at 30 frames per second and provides a higher resolution video image. However, currently available consumer DVD player architectures are unable to process the higher resolution video stream without significant changes.

SUMMARY OF THE INVENTION

In general, the invention relates to processing high definition digital video.

In one or more aspects of the invention, a high definition video signal is processed. The method includes receiving a first high definition program stream that includes a first high definition video stream component. A first standard definition program stream is derived from the high definition program stream, which in some embodiments lacks a high definition video stream component. A second standard definition program stream is received, the second standard definition program stream being derived from the first standard definition program stream. In some embodiments, the second standard definition program stream includes a standard definition video stream, which in some embodiments may be generated. In some embodiments, the generated standard definition video stream may be a blue screen video stream. A second high definition program stream is derived from the second standard definition program stream and the first high definition video stream component. In some embodiments, the generated standard definition video stream is scaled to a resolution compatible with the first high definition video stream component. In some embodiments, the scaled standard definition video stream is replaced by the first high definition video stream.

In one or more aspects of the invention, a high definition digital video signal is produced. The method includes demuxing a high definition program stream into at least one high definition video data stream component and a plurality of companion component data streams, which in some embodiments includes an audio data stream, subpicture information, and navigational information. The demuxed component data streams are then muxed with a standard resolution video stream, which in one exemplary embodiment is a generated blue screen video elementary stream, to create a standard definition video program stream. The muxed standard definition video program stream is then demuxed into a standard definition video data stream and a subpicture data stream. The resolution of the demuxed standard definition video data stream is then scaled up to a resolution consistent with the high definition video data stream component previously extracted from the high definition program stream. The demuxed subpicture data stream is overlaid with the scaled up standard definition video stream, and the standard definition video stream is then replaced with the at least one high definition video data stream.

In some embodiments the high definition program stream is received from an external source, and in some embodiments is in an encrypted format and is decrypted prior to being demuxed. In some embodiments, the at least one high definition video data stream component is in a compressed format, and is decompressed prior to replacing the standard definition video stream.

In one or more aspects of the invention, an apparatus is used for producing a high definition video signal. The apparatus includes a high definition program stream demuxer for extracting a plurality of component data streams from a high definition program stream. The plurality of component data streams comprises at least one high definition video data stream and a set of other component data streams. The apparatus further includes a generator for generating a standard definition video stream, a muxer for combining the generated standard definition video stream with the set of other component data streams into a standard definition program stream, a video scaler for increasing the resolution of the standard definition video stream to a resolution consistent with the high definition video stream, a video mixer for replacing the scaled up standard definition video stream with the high definition video data stream, and an encrypter for creating a high definition video data signal from the high definition video data stream and the set of other component data streams.

In some embodiments, the apparatus may include a receiver for receiving a program data stream. In some embodiments, the apparatus may include a router for determining if the received program data stream is a high definition program stream. In some embodiments, the received program data stream may be encrypted, and in such embodiments the apparatus may further include a decrypter for decrypting the encrypted program data stream.

One or more aspects of the invention may provide one or more of the following features. A pre-existing digital video disc player circuitry architecture can be modified in a practical way such that resulting enhanced players can play both standard definition and high definition digital video discs, and produce high definition video from high definition digital video discs. Existing functionality of the pre-existing digital video disc player circuitry architecture, such as navigation control, audio support, and subpicture support can be leveraged while adding the capability of producing high definition video, thus avoiding excessive complexity and cost conventionally associated with producing an enhance player.

While particularly useful for digital video discs, these methods and tools are not limited to that specific application, and can be used in other applications where digital video data is processed.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
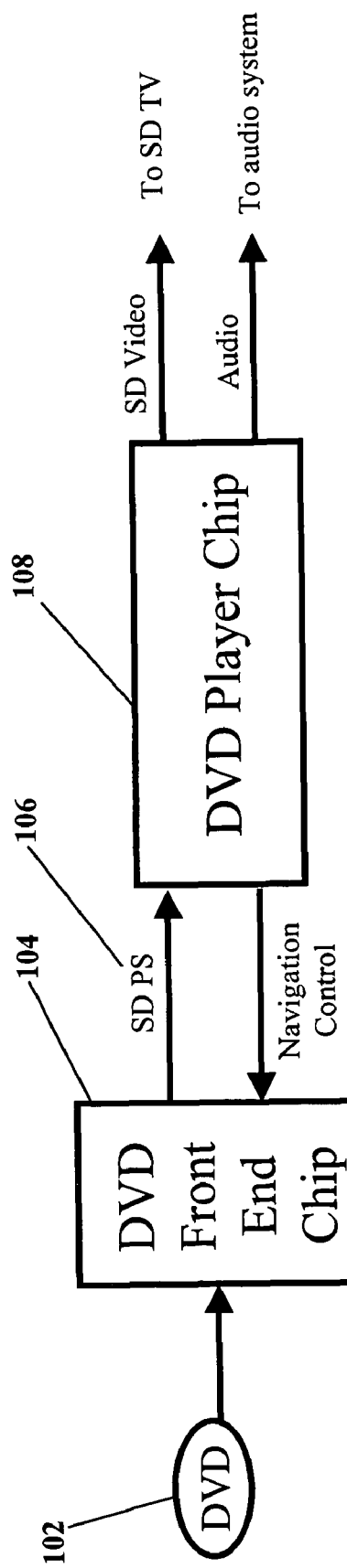
FIG. 1 is a block diagram of a standard definition DVD player.

Referring to FIG. 1, commonly available consumer DVD players (SD-DVD players) accept Standard Definition DVD's (102) that produce a video signal with a resolution of 720×480 pixels at 30 frames per second. SD-DVD players contain a DVD Front-End chip (104) and a Standard Definition DVD Player chip ("SD DVD Player chip") (108). The DVD Front-End chip controls a drive, a laser, and reads data in the form of a standard definition program stream (106) from the DVD. The SD DVD Player chip (108) controls the Front-End chip (104), and manages decrypting and decompressing the standard definition program stream (106), and sends them to the appropriate video and audio components of a video display system.

Standard definition video program streams are encrypted using the Content Scrambling System, ("CSS"), and the decryption technique is referred to as "DeCSS." Video decompression of a standard definition video program stream includes using the MPEG-2 video compression standard to decompress the video component of the program stream, the and Dolby Digital 5.1 standard for the audio component of the program stream.

Figure 2:
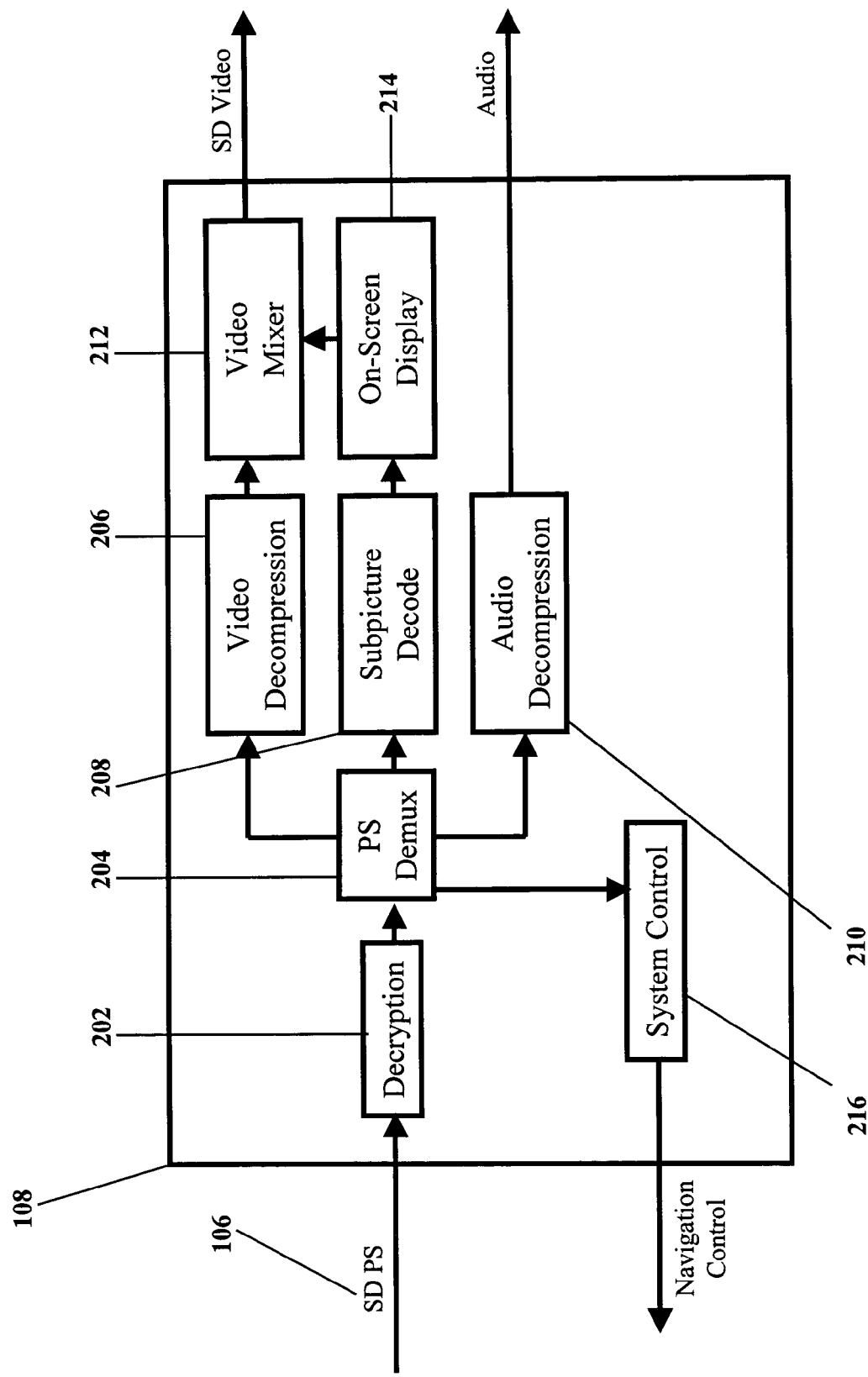
FIG. 2 is block diagram of a DVD Player Chip from a standard definition DVD player.

Referring to FIG. 2, the SD DVD Player chip (108) includes a decryption device (202) for decrypting the program stream (106), and a program stream demux device (204) which separates the program stream (106) into its four components. The four components include: a compressed video stream in "standard definition" DVD format; a compressed audio stream; a compressed subpicture stream for menus, sub-titles, and other interactive features of the DVD; and a stream of navigational information. In some embodiments, the demuxing device can be a software program running on an embedded microprocessor, or in some embodiments reside on a dedicated piece of hardware.

The compressed video stream is sent to a video decompression device (206), the subpicture stream is sent to a subpicture decoding device (208), the compressed audio stream is sent to an audio decompression device (210), and the navigation information is sent to a System Control Processor (216). In some embodiments, the video decompression device can be a piece of dedicated hardware, and the audio decompression device can be an embedded digital signal processor. In some embodiments, the subpicture decoding device can run on an embedded microprocessor such as the System Control Processor (216). The decompressed video and decoded subpicture streams are then mixed at a video mixer (212) and sent to a standard definition television for viewing. The decompressed audio stream is sent to an audio receiver for playback.

Figure 3:
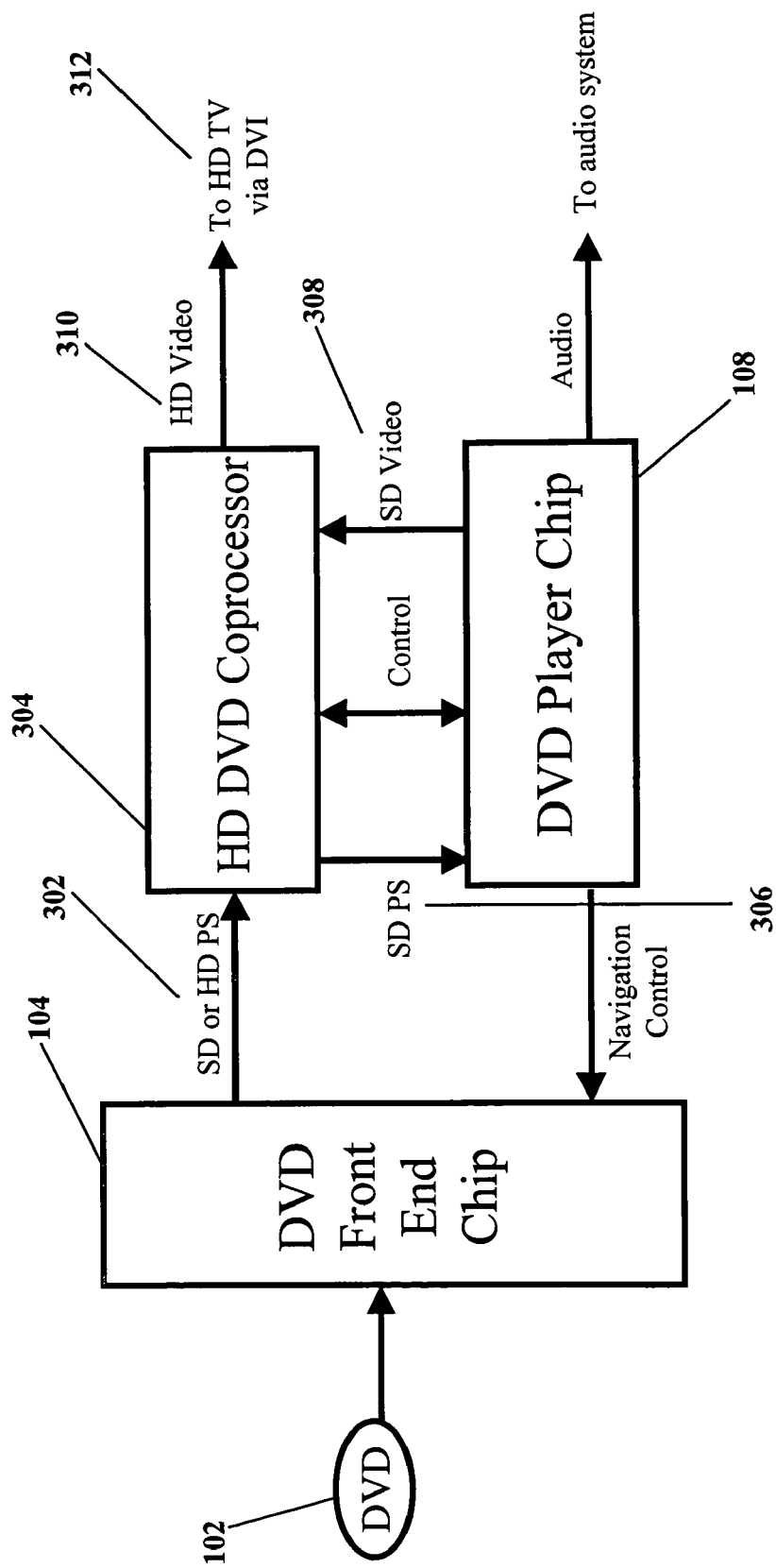
FIG. 3 is a block diagram illustrating a standard definition DVD player with a high definition DVD co-processor chip.

Referring to FIG. 3, in accordance with the invention, a High Definition Coprocessor (304) is provided. The High Definition Coprocessor (304) can be added to an existing SD DVD player architecture such that the resulting enhanced SD DVD player is able to produce both a standard definition DVD signal from a standard definition DVD and a high definition DVD signal (302) from a high definition DVDs (102), while avoiding excessive changes to the SD DVD player architecture.

Figure 4:
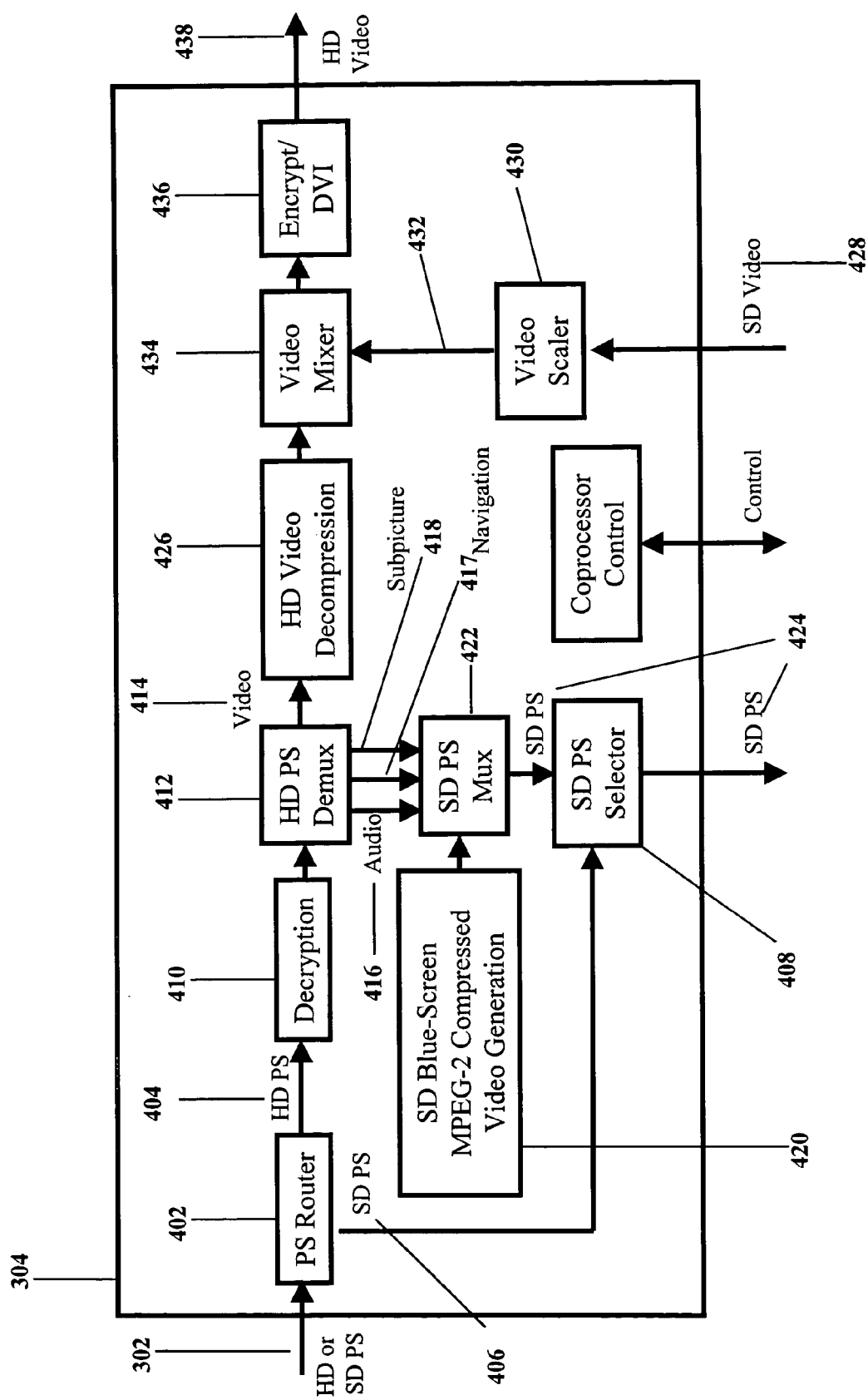
FIG. 4 is a more detailed block diagram of the DVD co-processor of FIG. 3.
Figure 5:
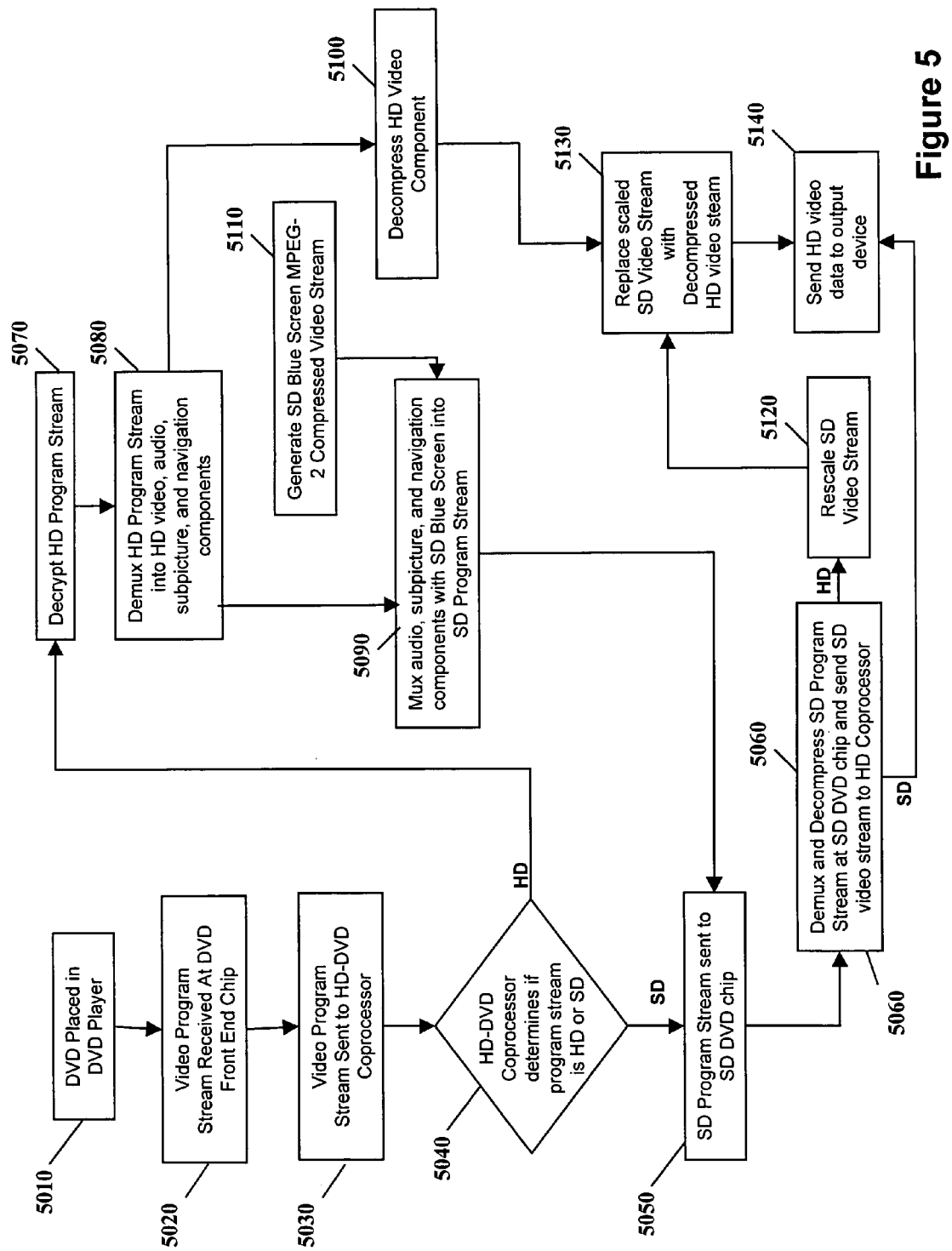
FIG. 5 is a flow diagram illustrating a method of producing high definition video.

Referring to FIGS. 4 and 5, when a DVD is placed in a DVD player that includes a HD DVD Coprocessor (304) (step 5010), the HD DVD Coprocessor (304) detects whether the program stream (302) is high definition or standard definition (e.g., from a high definition DVD or standard definition DVD, respectively) via a new Program Stream Descriptor (steps 5020-5040). If the program stream is a standard definition program stream, a program stream router (402) directs the signal to a standard definition program stream selector (408) that subsequently sends the standard definition program stream to the Standard Definition DVD Player chip (step 5050).

If the program stream is a high definition program stream, the program stream router (402) directs the high definition program stream (404) to a high definition decryption device (410) (step 5070) and a high definition program stream demuxer (412) (step 5080). Using the methods described above, the demuxer (412) breaks the program stream into its four components: HD video (414), audio (416), subpicture (418), and navigation information (417). The HD video stream (414) is sent to a HD Video Decompression device (426) where it is decompressed and forwarded to a Video Mixer (432) (step 5100), which in some embodiments is a dedicated piece of hardware using video compression standards well know in the industry such as MPEG-4 Part 10 or Microsoft Windows Media Video 9.

In a specific example implementation, the audio stream (416), subpicture stream (418) and navigation information stream (417) are remuxed by a standard definition remuxer (422) together with a compressed blue screen video stream in standard resolution video format (step 5090) generated by a blue screen generator (420) (step 5110). This remuxed standard definition program stream (424) is sent to the Standard Definition DVD Player chip (108) (step 5050).

The Standard Definition DVD Player chip (108) demuxes and decompresses the standard definition program stream using similar methods and devices described above (step 5060). The decompressed standard definition video stream (428) is overlaid with the decompressed standard definition subpicture stream and sent back to the HD DVD Coprocessor (304) where a Video Scaler (430) produces a scaled up digital video stream (432) having the higher resolution required for HD DVD (Step 5120). For example, a dedicated piece of hardware may be used to implement a set of separable horizontal and vertical polyphase filters.

The decompressed high definition video stream produced by the HD DVD coprocessor (304) is forwarded to a Video Mixer (434). The scaled up the standard digital video stream (432) is mixed with the decompressed HD video stream at the Video Mixer (434). This process is accomplished by replacing only the blue screen pixels added by the Standard Definition Blue-Screen Video Generator (420) (step 5130) prior to being sent to the DVD Player chip (108) with the HD video signal (414) that was decompressed at the HD Video Decompressor (426). The resulting HD video data (438) is then output to a commercially available television or other suitable recipient (step 5140).

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for producing a high definition video signal comprising:
    performing by at least one circuit:
        demuxing a high definition program stream into at least one high definition video data stream component and a plurality of companion component data streams;
        muxing the plurality of companion component data streams with a standard resolution video stream into a standard definition video program stream;
        demuxing the standard definition program stream into a standard definition video data stream, and a subpicture data stream;
        scaling the standard definition video stream to a resolution consistent with the high definition video data stream;
        overlaying the scaled standard definition video stream with the demuxed subpicture data stream;
        and replacing the standard definition video stream with the at least one high definition video data stream to produce a high definition video data signal.

2. The method of claim 1 further including, prior demuxing the high definition program stream, receiving a program data stream.

3. The method of claim 2 further including determining if the received program data stream is a high definition program data stream.

4. The method of claim 1 wherein the plurality of companion component data streams comprises one or more of audio data stream, a subpicture data stream, and a navigational data stream.

5. The method of claim 1 wherein the high definition program stream is in encrypted format.

6. The method of claim 5 further comprising, prior to demuxing the high definition program stream, decrypting the encrypted high definition program stream.

7. The method of claim 1 wherein the at least one high definition video data stream component is in compressed format.

8. The method of claim 7 further comprising, prior to the replacing step, decompressing the high definition video data stream.

9. The method of claim 1 further comprising generating the standard resolution video stream.

10. The method of claim 9 wherein the generated standard resolution video stream comprises a blue screen video elementary stream.

11. An apparatus for use in producing a high definition video data signal, comprising:
    a high definition program stream demuxer for extracting a plurality of component data streams from a high definition program stream, the plurality of component data streams comprising at least one high definition video data stream and a set of other component data streams;
    a generator for generating a standard definition video stream;
    a muxer for combining the generated standard definition video stream with the set of other component data streams into a standard definition program stream;
    a video scaler for increasing the resolution of the standard definition video stream to a resolution consistent with the high definition video stream;
    a video mixer for replacing the scaled up standard definition video stream with the high definition video data stream;
    and an encrypter for creating a high definition video data signal from the high definition video data stream and the set of other component data streams.

12. The apparatus of claim 11 further including a receiver for receiving a program data stream.

13. The apparatus of claim 12 wherein the received program data stream is in encrypted format.

14. The apparatus of claim 13 further including a decrypter for decrypting the encrypted program data stream.

15. The apparatus of claim 12 further including a router for determining if the received program data stream is a high definition program stream.

* * * * *